(12) United States Patent
Kunishima

(10) Patent No.: US 10,105,914 B2
(45) Date of Patent: Oct. 23, 2018

(54) GEAR AND MANUFACTURING METHOD THEREOF

(71) Applicant: JTEKT CORPORATION, Osaka-shi, Osaka (JP)

(72) Inventor: Takeshi Kunishima, Shiki-gun (JP)

(73) Assignee: JTEKT CORPORATION, Osaka (JP)

( * ) Notice: Subject to any disclaimer, the term of this patent is extended or adjusted under 35 U.S.C. 154(b) by 118 days.

(21) Appl. No.: 14/794,319

(22) Filed: Jul. 8, 2015

(65) Prior Publication Data
US 2016/0016368 A1    Jan. 21, 2016

(30) Foreign Application Priority Data

Jul. 16, 2014 (JP) ................................. 2014-146022

(51) Int. Cl.
| | | |
|---|---|---|
| *B29C 70/54* | (2006.01) | |
| *B29C 45/14* | (2006.01) | |
| *B29C 70/68* | (2006.01) | |
| *F16H 55/06* | (2006.01) | |
| *F16H 55/17* | (2006.01) | |

(Continued)

(52) U.S. Cl.
CPC ........ *B29C 70/542* (2013.01); *B29C 45/0005* (2013.01); *B29C 45/1459* (2013.01); *B29C 45/14065* (2013.01); *B29C 45/14631* (2013.01); *B29C 45/14819* (2013.01); *B29C 70/462* (2013.01); *B29C 70/48* (2013.01); *B29C 70/545* (2013.01); *B29C 70/682* (2013.01); *B29D 15/00* (2013.01); *F16H 55/06* (2013.01); *F16H 55/17* (2013.01); *B29K 2105/0809* (2013.01); *B29K 2105/12* (2013.01); *B29L 2015/003* (2013.01); *F16H 2055/065* (2013.01)

(58) Field of Classification Search
CPC .......... B29D 15/00; B29L 2015/00–2015/006; F16H 2055/065; Y10T 29/49462; Y10T 29/49467; Y10T 29/49478; Y10T 29/4948; Y10T 29/49801; B23P 15/14; B29C 45/0005; B29C 45/14; B29C 45/1459; B29C 45/14631; B29C 45/14819; B29C 70/48; B29C 70/68; B29C 70/682; B29C 70/70
See application file for complete search history.

(56) References Cited

U.S. PATENT DOCUMENTS

| | | | | |
|---|---|---|---|---|
| 5,074,828 | A | 12/1991 | Ellis | |
| 2001/0030381 | A1* | 10/2001 | Kobayashi | ............ B29C 70/345 264/257 |
| 2002/0043124 | A1* | 4/2002 | Shiga | ...................... B29C 45/16 74/434 |

FOREIGN PATENT DOCUMENTS

| | | |
|---|---|---|
| DE | 202010011914 U1 | 12/2010 |
| EP | 1176083 A1 | 1/2002 |

(Continued)

OTHER PUBLICATIONS

Nov. 16, 2015 Extended Search Report issued in European Patent Application No. 15176187.1.

(Continued)

*Primary Examiner* — Matthew P Travers
(74) *Attorney, Agent, or Firm* — Oliff PLC

(57) ABSTRACT

In a manufacturing method, an annular preform made of reinforcing fibers is set in a region of a mold which corresponds to a sleeve. In this state, this region of the mold and a region of the mold which corresponds to a tooth portion are filled with a resin. A gear is manufactured by this process.

19 Claims, 3 Drawing Sheets

(51) Int. Cl.
B29C 45/00 (2006.01)
B29C 70/46 (2006.01)
B29D 15/00 (2006.01)
B29C 70/48 (2006.01)
B29L 15/00 (2006.01)
B29K 105/08 (2006.01)
B29K 105/12 (2006.01)

(56) References Cited

FOREIGN PATENT DOCUMENTS

| | | |
|---|---|---|
| JP | S58-59820 A | 4/1983 |
| JP | 2001-304379 A | 10/2001 |
| JP | 2009-039966 A | 2/2009 |
| JP | 2011-220463 A | 11/2011 |

OTHER PUBLICATIONS

Feb. 15, 2018 Office Action issued in Japanese Application No. 2014-146022.

* cited by examiner

GEAR AND MANUFACTURING METHOD THEREOF

INCORPORATION BY REFERENCE

The disclosure of Japanese Patent Application No. 2014-146022 filed on Jul. 16, 2014 including the specification, drawings and abstract, is incorporated herein by reference in its entirety.

BACKGROUND OF THE INVENTION

1. Field of the Invention

The present invention relates to resin gears and manufacturing methods thereof.

2. Description of the Related Art

For example, in electric power steering systems, rotation of an electric motor for steering assist is reduced in speed and amplified in output via a speed reducer and is then transmitted to a steering operation mechanism, thereby assisting operation of the steering operation mechanism which is performed by operation of the driver. A speed reducer including a worm and a worm wheel which mesh with each other is usually used as such speed reducer. The worm wheel is typically manufactured by forming an annular resin member around a sleeve made of, e.g., iron by injection molding (insert molding) etc. and then forming teeth on the outer periphery of the resin member by cutting etc.

For example, the resin member is made of a polyamide (PA6, PA66, PA46, etc.), an aromatic polyamide, a polyacetal, PEEK, PPS, etc. Further reduction in weight of automotive parts is desired in response to the recent need for reduced environmental load. The weight of the iron sleeve of the worm wheel is relatively great in the overall weight of the electric power steering system. It is therefore necessary to reduce the overall weight of the worm wheel including such a core while maintaining required strength and rigidity.

In recent years, fiber reinforced composites that are lightweight, strong, and rigid have been increasingly applied to automotive parts. Examples of the fiber reinforced composites include carbon fiber reinforced plastics (CFRP) using carbon fibers as reinforcing fibers and using thermosetting resins, and carbon fiber reinforced thermoplastics (CFRTP) using carbon fibers as reinforcing fibers and using thermoplastic resins.

For example, the following methods are possible in order to reduce the weight of gears of worm wheels etc. by using such fiber reinforced composites.

(1) A prepreg, which is a reinforcing fiber sheet impregnated with a thermosetting resin, is wound in an annular shape. Then, a disc-shaped molding made of the fiber reinforced composite and having a shape corresponding to the overall shape of the gear is produced by sheet winding in which a thermosetting resin is cured. Teeth are formed in the outer periphery of the disc-shaped molding by cutting etc.

(2) A sleeve made of a fiber reinforced composite is produced by the sheet winding. Then, an annular resin member is formed on the outer periphery of the sleeve by insert molding etc. in a manner similar to that of conventional examples. Teeth are formed in the outer periphery of the resin member by cutting etc. (Japanese Patent Application Publication No. 2001-304379 (JP 2001-304379 A).

Since the gear formed by the method (1) is made of the fiber reinforced composite up to the tip ends of the teeth, this gear is rigid but is not very tough. For example, in the case of the worm wheels, noise called rattling noise (tooth knocking noise) tends to be generated when the gear meshing with the worm is rotated. Moreover, continuous reinforcing fibers are cut or the resin is separated from reinforcing fibers when forming the teeth by cutting. This can be a fracture origin, thereby reducing shock resistance and mechanical strength of the gear.

The gear formed by the method (2) is not satisfactory in terms of reliability of bonding between the sleeve and the tooth portion, thermal shock resistance, etc. If knurling, blasting, etching, etc. is performed on the outer periphery of the sleeve which is in contact with the tooth portion in order to improve these characteristics and to retain the tooth portion on the sleeve, to prevent relative rotation between the tooth portion and the sleeve, etc., continuous reinforcing fibers are cut or the resin is separated from reinforcing fibers. This can be a fracture origin, thereby reducing shock resistance and mechanical strength of the gear.

The resin that is used for the fiber reinforced composite in the methods (1) and (2) is limited to flexible epoxy resins having appropriate stickiness before being cured, etc. However, in the case of fiber reinforced composites using such epoxy resins etc., it takes as long as about five hours or more (including time required for fluidization) until the curing reaction is completed. This significantly reduces productivity of gears and electric power steering systems including the gears.

SUMMARY OF THE INVENTION

It is an object of the present invention to provide a method for manufacturing a gear, which is capable of efficiently manufacturing with high productivity a lightweight gear in which a strong, rigid sleeve made of a fiber reinforced composite and a tooth portion made of a resin containing no reinforcing fibers and thus being flexible, tough, and less likely to generate rattling noise etc. and having high shock resistance are firmly fixed together, without causing cutting of continuous reinforcing fibers, separation of reinforcing fibers, etc., and a gear manufactured by the manufacturing method.

According to one aspect of the present invention, a method for manufacturing a gear includes: setting an annular preform made of a reinforcing fiber in a region corresponding to a sleeve in a mold, the mold including an annular region corresponding to a tooth portion as a radial outermost region and a region located radially inward of the annular region so as to contact the annular region and corresponding to the sleeve; and impregnating the set annular preform with a resin and filling the entire regions of the mold which correspond to the tooth portion and the sleeve with the resin.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1A:
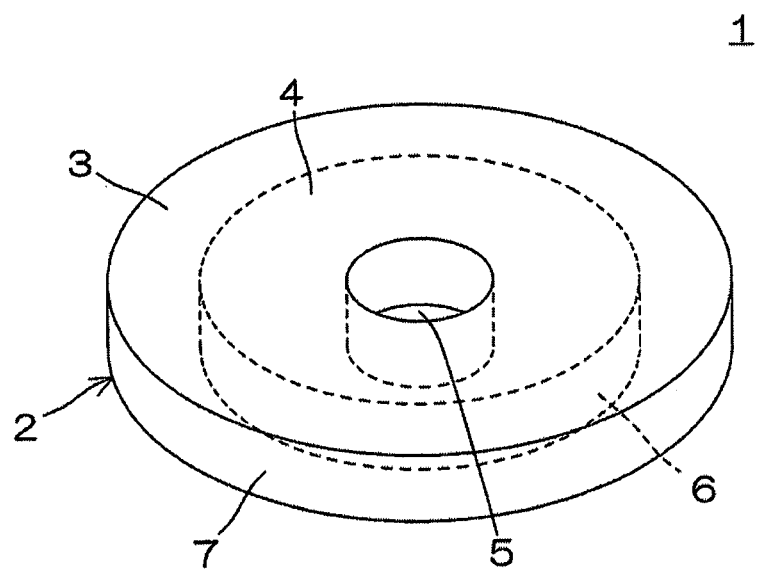
FIG. 1A is a perspective view showing a molding that is formed by setting an annular preform in a mold, and impregnating the annular preform with a resin and filling each region of the mold with the resin in an example of a method for manufacturing a gear according to the present invention, and showing the molding before teeth are formed in the outer periphery thereof.

Referring to FIG. 1A, a molding 2 serving as a base of a gear 1 has an annular tooth portion 3 as a radial outermost portion thereof and a thick disc-shaped sleeve 4 located radially inward of the tooth portion 3 so as to contact the tooth portion 3. A through hole 5 is formed in the center of the sleeve 4 so that a shaft, not shown, is inserted through and fixed in the through hole 5. The sleeve 4 has an annular preform 6 embedded therein, and is made of a fiber reinforced composite that is formed by impregnating reinforcing fibers forming the annular preform 6 with a resin. The tooth portion 3 is made of a resin containing no reinforcing fibers. The tooth portion 3 and the sleeve 4 are firmly fixed together by a continuous phase of the resin.

Figure 2A:
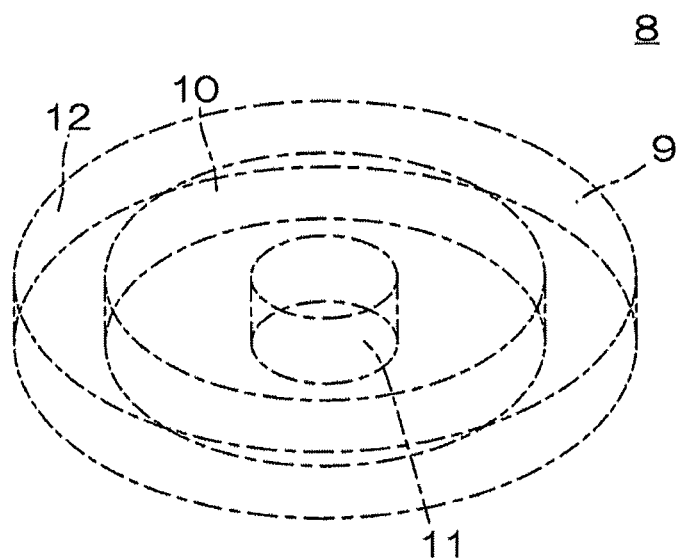
FIG. 2A is a perspective view illustrating the position of the region that accommodates the annular preform and that is filled with the resin in the mold used in the manufacturing method of the above example.

Each of the through hole 5 and an outer periphery 7 of the tooth portion 3 has a cylindrical shape having a constant diameter. The outer periphery 7 is located concentrically with the through hole 5. The annular preform 6 embedded in the sleeve 4 is also located concentrically with the through hole 5. Referring to FIG. 2A, a mold 8 for producing the molding 2 includes a first region 9 and a second region 10. The first region 9 corresponds to the three-dimensional shape of the tooth portion 3. The second region 10 is located radially inward of the first region 9 so as to contact the first region 9, and corresponds to the three-dimensional shape of the sleeve 4. A columnar pin 11 corresponding to the through hole 5 and having a constant diameter is inserted through the center of the second region 10.

An inner periphery 12 of the first region 9 has a cylindrical shape corresponding to the outer periphery 7 of the tooth portion 3 and having a constant diameter. The inner periphery 12 and the pin 11 are located concentrically with each other so that the outer periphery 7 and the through hole 5 of the molding 2 are formed concentrically with each other. Accuracy of the inside diameter of the through hole 5 depends on accuracy of the outside diameter of the pin 11. Accordingly, accuracy of press-fitting of the shaft in the through hole 5 can be improved by increasing the accuracy of the outside diameter of the pin 11. Alternatively, the through hole 5 may be formed by cutting after molding so that the inside diameter of the through hole 5 has predetermined accuracy.

Figure 2B:
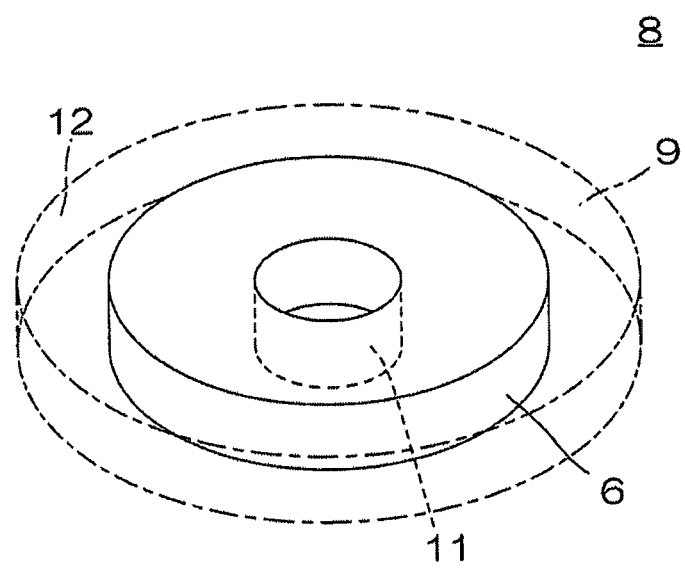
FIG. 2B is a perspective view showing the state where the annular preform has been set in the region of the mold which corresponds to a sleeve.

Referring to FIG. 2B, in the manufacturing method of this example, the annular preform 6 is first set in the second region 10 of the mold 8. As shown in the figure, a preform whose inside diameter is substantially the same as the outside diameter of the pin 11 is used as the annular preform 6. This allows the annular preform 6 to be located concentrically with the through hole 5 as described above.

Figure 3A:
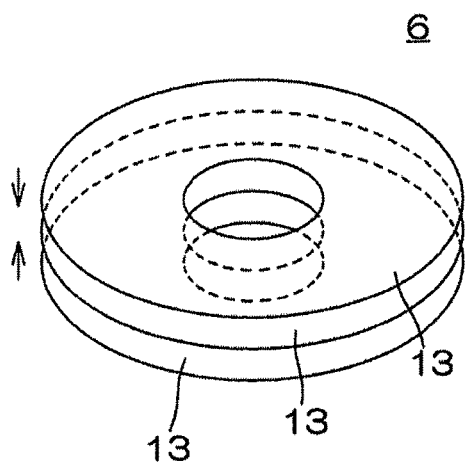
FIGS. 3A to 3D are perspective views showing examples of the annular preform that is set in the mold.

For example, preforms shown in FIGS. 3A to 3D etc. can be used as the annular preform 6. For example, the annular preform 6 of FIG. 3A is formed by stacking a plurality of discs 13 with a hole, which are made of reinforcing fibers, to a predetermined thickness in the thickness direction as shown by arrows in the figure. Examples of the disc 13 with a hole include a fabric produced by weaving reinforcing fibers into a disc shape with a hole, or a sheet-like fabric or a unidirectional material punched into a disc shape with a hole, etc.

Figure 3B:
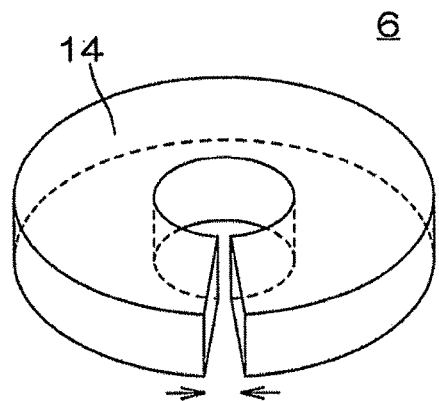
Figure 3C:
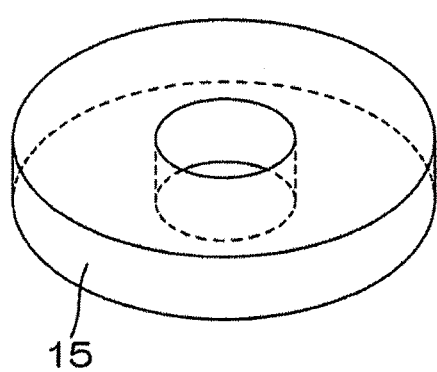

The annular preform 6 of FIG. 3B is formed by weaving reinforcing fibers into a braided cord 14 having a certain thickness and a certain width and connecting both ends of the braided cord 14 into an annular shape as shown by arrows in the figure. In the case where the braided cord 14 is not thick enough, a plurality of braided cords 14 may be stacked in the thickness direction like the discs 13 with a hole shown in FIG. 3A. The annular preform 6 of FIG. 3C is formed as a three-dimensional fabric 15 produced by weaving reinforcing fibers into a three-dimensional shape.

Figure 3D:
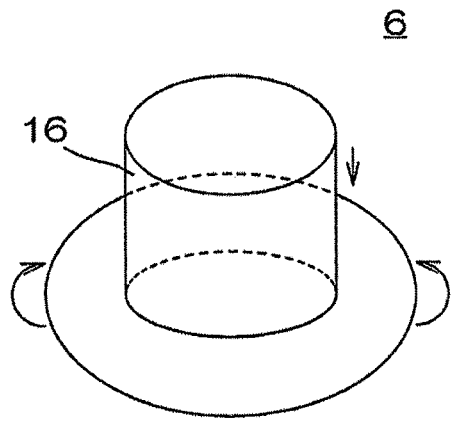

The annular preform 6 of FIG. 3D is formed by weaving reinforcing fibers to form a cylinder 16 and winding up the cylinder 16 in the longitudinal direction shown by arrows in the figure. Various fibers such as carbon fibers, glass fibers, or aramid fibers can be used as the reinforcing fibers for the annular preform 6. In particular, carbon fibers are preferable in order to make the sleeve 4 of the gear 1 as strong and rigid as possible. Carbon fibers having tensile strength of 3,000 MPa or more and a tensile modulus of elasticity of 200 GPa or more are preferable in order to further enhance these effects of carbon fibers.

In order to ensure satisfactory adhesion to the resin, the surfaces of the carbon resins are preferably treated with, e.g., a urethane, epoxy, acrylic, bismaleimide, or other sizing agent.

In the manufacturing method of this example, a resin is then injected into the first and second regions 9, 10 of the mold 8. The annular preform 6 set in the second region 10 is thus impregnated with the resin, and the entire first and second resins 9, 10 are filled with the resin, whereby the molding 2 as shown in FIG. 1A is formed.

For example, the regions 9, 10 of the mold 8 can be filled with the resin by injection molding, namely by heating and melting the resin and injecting the resin in the fluidized state by an injection molding machine through a gate (not shown). Any type of gate may be used as the gate, such as a pin gate communicating with a plurality of desired positions of the first or second regions 9, 10 of the mold 8 or a disc gate communicating with the entire circumference of the first region 9 and/or the second region 10.

In the case where the resin is a thermoplastic resin, the molding 2 is formed by cooling and solidifying the resin filling the first and second regions 9, 10. In the case where the resin is a thermosetting resin, the molding 2 is formed by filling the first and second regions 9, 10 and then curing the resin by heating. Various thermoplastic resins that can be injection molded can be used as the thermoplastic resin. For example, engineering plastics such as a polyamide (PA6, PA66, PA46, etc.) or super engineering plastics such as an aromatic polyamide (PA6T, PT9T, PPA), a polyacetal, PEEK, and PPS which are often used particularly in the mechanical field are preferable as the thermoplastic resin.

Various thermosetting resins that can be injection molded and that are cured quickly can be used as the thermosetting resin. Examples of such a thermosetting resin include a phenol resin (resol or novolac type) and an unsaturated polyester resin. An epoxy resin capable of being cured quickly instead of being sticky, flexible, etc. can be used as the thermosetting resin. A filler may be added to the resin. Adding the filler can further improve toughness, strength, wear resistance, shock resistance, etc. of the tooth portion 3 while particularly maintaining satisfactory flexibility of the tooth portion 3 containing no reinforcing fibers. Moreover, adding the filler can further improve strength and rigidity of the sleeve 4 and thus overall strength and rigidity of the gear 1 as the reinforcing fibers forming the annular preform 6 is impregnated with the filler.

Examples of the filler include one or more of a fibrous filler such as glass fibers and carbon fibers, a plate-like filler such as glass flakes, and a filler capable of finely reinforcing the resin such as carbon nanotubes and carbon nanofibers. Both in the case where the filler is not added to the resin and in the case where the filler is added to the resin, the resin (the resin itself in the former case, and the resin containing the filler in the latter case) preferably has a melt flow rate of 30 g/10 min or more, and more preferably 50 g/10 min or more, during injection molding (in the melted state).

If the melt flow rate is lower than the above range, the annular preform 6 cannot be satisfactorily completely impregnated with the resin or with the resin and the filler by injection molding. As a result, a part of the annular preform 6 which has failed to be impregnated with the resin may serve as a fracture origin, reducing mechanical strength of the gear 1. Moreover, the regions 9, 10 may fail to be completely and sufficiently filled with the resin, resulting in defective molding. In order to adjust the melt flow rate in the above range, a viscosity reducer, a dispersant, an amorphous resin for reducing the solidification rate, etc. may be added as appropriate to the resin.

In particular, in the case of using a resin having high melt viscosity during injection molding, in order to satisfactorily completely impregnate the annular preform 6 with the resin or with the resin and the filler, or to completely and sufficiently fill the regions 9, 10 with the resin or with the resin and the filler, the mold 8 may be evacuated and injection molding may be performed under reduced pressure. In the manufacturing method of this example, the regions 9, 10 can be filled with a liquid precursor of the resin or a liquid resin by, e.g., resin injection molding such as resin transfer molding (RTM) or vacuum resin transfer molding (VaRTM).

An example of the liquid precursor of the resin which is used in the above methods is a mixture of a monomer or oligomer that produces the thermoplastic resin such as monomer-cast nylon with a polymerization catalyst, a polymerization promoting catalyst, a reaction initiator, etc. An example of the liquid resin is a liquid thermosetting resin capable of being injected into the mold 8 by resin injection molding and capable of being cured quickly. Examples of such a thermosetting resin include a phenol resin (resol or novolac type), an unsaturated polyester resin, an epoxy resin capable of being cured quickly instead of being sticky, flexible, etc. and being in a liquid state before being cured, and a resin liquefied by adding a reactive diluent etc.

A similar filler may be added to the liquid precursor of the resin or to the liquid resin for a reason similar to the above reason in the case of injection molding. For example, in the RTM method, the liquid precursor or the liquid resin is injected into the mold 8 by a clamping force and a pump pressure. In the VaRTM method, the mold 8 is evacuated so that the liquid precursor or the liquid resin is sucked and injected therein. In the case of using the liquid precursor, the liquid precursor is then heated as necessary, whereby the monomer etc. produces the resin by a polymerization reaction, and the resin become solidified to form the molding 2. In the case of using the liquid thermosetting resin, the liquid thermosetting resin is heated and cured after the mold 8 is filled therewith, whereby the molding 2 is formed.

Figure 1B:
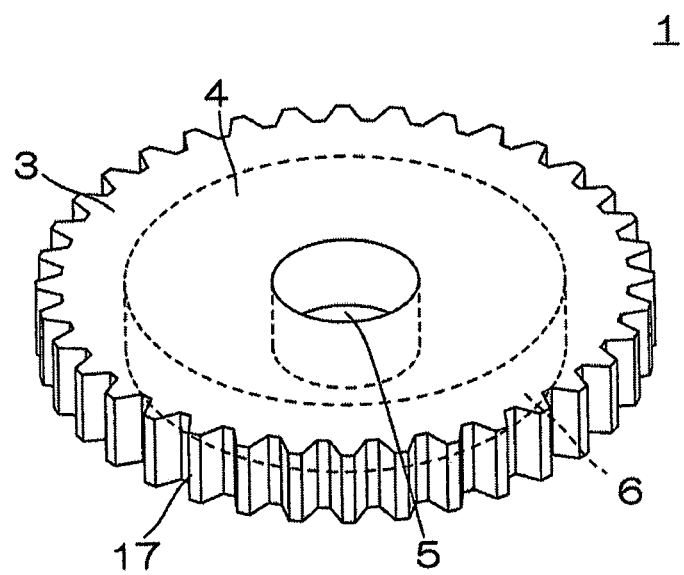
FIG. 1B is a perspective view showing an example of a completed gear produced by removing the molding from the mold and forming the teeth in the outer periphery of the molding.

Referring to FIGS. 1A and 1B, the molding 2 thus formed by one of the above methods is removed from the mold 8. Teeth 17 are then formed in the outer periphery 7 of the tooth portion 3 by cutting in a manner similar to that of conventional examples. The gear 1 is thus completed. In the gear 1 of the example of FIG. 1A which is manufactured by the above process, the strong, rigid sleeve 4 made of the fiber reinforced composite and the tooth portion 3 made of the resin containing no reinforcing fibers and thus being flexible, tough, and less likely to generate rattling noise etc. and having high shock resistance are firmly fixed together by the continuous phase of the resin. The gear 1 is thus lightweight.

Accordingly, for example, using the gear 1 thus manufactured as a worm wheel of a speed reducer of an electric power steering system can significantly reduce the weight of the speed reducer and thus the weight of the electric power steering system. The configuration of the present invention is not limited to the illustrated example shown in the figures. For example, the shaft may be set at the position of the pin 11 of the mold 8, and insert molding may be performed. The molding 2 having the shaft inserted and fixed therein can thus be formed simultaneously with molding.

Alternatively, protrusions and recesses corresponding to the teeth 17 may be formed in the region corresponding to the outer periphery 7 of the tooth portion 3 of the mold 8, and the teeth 17 may be directly formed in the outer periphery 7 of the tooth portion 3 by injecting the resin. Various other modifications can be made without departing from the spirit and scope of the present invention.

What is claimed is:
1. A method for manufacturing a gear, comprising:
setting, in a radially inward region of a mold, an annular preform that is made of a reinforcing fiber and corresponds to a region of a sleeve of the gear, the mold also including an annular, radially outermost region that corresponds to a tooth portion of the gear, that is located radially outward of the inward region and the annular preform, and contacts the inward region; and
impregnating the set annular preform with a resin-containing material and entirely filling with the resin-containing material the inward and outermost regions of the mold (i) so that the sleeve of the gear includes the reinforcing fiber and the tooth portion consists of the impregnated resin-containing material and (ii) so that the sleeve of the gear with the reinforcing fiber abuts a center through hole of the gear.
2. The method according to claim 1, wherein
the annular preform is formed by stacking discs, made of the reinforcing fiber, that have a hole.
3. The method according to claim 2, wherein
the resin-containing material is heated and melted, and the melted material is injected into the mold by injection molding to impregnate the annular preform with the resin-containing material and to fill entirely the regions of the mold with the material.
4. The method according to claim 2, wherein
a liquid precursor of the resin-containing material or a liquid resin is injected into the mold by resin injection molding to impregnate the annular preform with the liquid precursor or the liquid resin and to fill entirely the regions of the mold with the liquid precursor or the liquid resin.

5. The method according to claim 2, wherein
the tooth portion is formed to have a cylindrical outer periphery, and teeth are formed in the outer periphery by cutting after a molding is removed from the mold.

6. The method according to claim 1, wherein
the annular preform is formed by connecting a braided cord made of the reinforcing fiber into an annular shape.

7. The method according to claim 6, wherein
the resin-containing material is heated and melted, and the melted material is injected into the mold by injection molding to impregnate the annular preform with the resin-containing material and to fill entirely the regions of the mold with the material.

8. The method according to claim 6, wherein
a liquid precursor of the resin-containing material or a liquid resin is injected into the mold by resin injection molding to impregnate the annular preform with the liquid precursor or the liquid resin and to fill entirely the regions of the mold with the liquid precursor or the liquid resin.

9. The method according to claim 6, wherein
the tooth portion is formed to have a cylindrical outer periphery, and teeth are formed in the outer periphery by cutting after a molding is removed from the mold.

10. The method according to claim 1, wherein
the annular preform is formed as a three-dimensional fabric made of the reinforcing fiber.

11. The method according to claim 10, wherein
the resin-containing material is heated and melted, and the melted material is injected into the mold by injection molding to impregnate the annular preform with the resin-containing material and to fill entirely the regions of the mold with the material.

12. The method according to claim 10, wherein
a liquid precursor of the resin-containing material or a liquid resin is injected into the mold by resin injection molding to impregnate the annular preform with the liquid precursor or the liquid resin and to fill entirely the regions of the mold with the liquid precursor or the liquid resin.

13. The method according to claim 10, wherein
the tooth portion is formed to have a cylindrical outer periphery, and teeth are formed in the outer periphery by cutting after a molding is removed from the mold.

14. The method according to claim 1, wherein
the annular preform is formed by winding up a cylinder made of the reinforcing fiber in a longitudinal direction.

15. The method according to claim 14, wherein
the resin-containing material is heated and melted, and the melted material is injected into the mold by injection molding to impregnate the annular preform with the resin-containing material and to fill entirely the regions of the mold with the material.

16. The method according to claim 14, wherein
a liquid precursor of the resin-containing material or a liquid resin is injected into the mold by resin injection molding to impregnate the annular preform with the liquid precursor or the liquid resin and to fill entirely the regions of the mold with the liquid precursor or the liquid resin.

17. The method according to claim 1, wherein
the resin-containing material is heated and melted, and the melted material is injected into the mold by injection molding to impregnate the annular preform with the resin-containing material and to fill entirely the regions of the mold with the material.

18. The method according to claim 1, wherein
a liquid precursor of the resin-containing material or a liquid resin is injected into the mold by resin injection molding to impregnate the annular preform with the liquid precursor or the liquid resin and to fill entirely the regions of the mold with the liquid precursor or the liquid resin.

19. The method according to claim 1, wherein
the tooth portion is formed to have a cylindrical outer periphery, and teeth are formed in the outer periphery by cutting after a molding is removed from the mold.

* * * * *